United States Patent
Soupal

(10) Patent No.: US 7,658,453 B2
(45) Date of Patent: Feb. 9, 2010

(54) SERVICE BRAKE RELAY WITH INTEGRATED QUICK RELEASE VALVE

(75) Inventor: Thomas R. Soupal, Rochester Hills, MI (US)

(73) Assignee: Meritor WABCO Vehicle Control Systems, Troy, MI (US)

( * ) Notice: Subject to any disclaimer, the term of this patent is extended or adjusted under 35 U.S.C. 154(b) by 753 days.

(21) Appl. No.: 11/355,383

(22) Filed: Feb. 16, 2006

(65) Prior Publication Data
US 2007/0188016 A1   Aug. 16, 2007

(51) Int. Cl.
   *B60T 13/00* (2006.01)
(52) U.S. Cl. ............................................ 303/9; 303/28
(58) Field of Classification Search ............. 303/36–39, 303/69, 118.1, 9, 28
   See application file for complete search history.

(56) References Cited

U.S. PATENT DOCUMENTS

| | | | | |
|---|---|---|---|---|
| 3,861,754 A | * | 1/1975 | Kruke et al. .................. 303/13 |
| 4,121,873 A | * | 10/1978 | Durling .......................... 303/7 |
| 5,340,212 A | * | 8/1994 | Latvala ........................... 303/7 |
| 6,116,280 A | * | 9/2000 | Goodell .................... 137/627.5 |
| 6,386,649 B1 | * | 5/2002 | Ross ....................... 303/119.2 |
| 6,655,750 B2 | * | 12/2003 | Soupal .......................... 303/9 |
| 7,077,481 B2 | * | 7/2006 | Marsh et al. .................. 303/40 |
| 2006/0076824 A1 | * | 4/2006 | Soupal .................... 303/118.1 |
| 2008/0258542 A1 | * | 10/2008 | Soupal .......................... 303/7 |

* cited by examiner

*Primary Examiner*—Christopher P Schwartz
(74) *Attorney, Agent, or Firm*—Carlson, Gaskey & Olds

(57) ABSTRACT

A combination quick release and service relay brake valve assembly is used to consolidate multiple valve functions within a common valve assembly, which reduces cost and overall complexity in an associated vehicle brake system. The combination quick release and service relay brake valve assembly includes a valve body with a quick release portion that has a parking brake port and a service brake control port, which is in fluid communication with an anti-compounding passage. The valve body also includes a service relay portion that has a supply port fluidly connected to a service brake air reservoir and a delivery port fluidly connected to a brake actuator that generates service brake requests.

21 Claims, 2 Drawing Sheets

SERVICE BRAKE RELAY WITH INTEGRATED QUICK RELEASE VALVE

TECHNICAL FIELD

The subject invention pertains to a single valve assembly for a vehicle brake system that provides a spring brake quick release valve function as well as a rear axle service brake relay valve function.

BACKGROUND OF THE INVENTION

Heavy vehicles, such as trucks, typically include brake systems that pneumatically apply rear service brakes. Additionally, an emergency brake arrangement is included within the brake systems to protect against brake failure in an event of loss of air pressure. The emergency brake arrangement comprises a spring that applies a mechanical brake force if an air pressure loss event occurs.

This type of arrangement utilizes brake actuators that have a service air chamber and a spring chamber. The service air chamber is selectively pressurized to apply a braking force in response to a service brake request. The spring chamber houses a spring that is biased to apply a braking force. Air pressure within the spring chamber acts against the bias of the spring to hold off any braking force that would be imposed by the spring. In an emergency situation such as a loss of air pressure, the bias of the spring automatically applies the service brakes.

This spring arrangement can also be utilized as a parking brake. When a parking brake request is initiated, air is exhausted from the spring chamber and the bias of the spring applies the service brakes to provide a parking brake function. Current braking systems for heavy vehicles utilize a rear axle service brake relay valve and a separate spring brake quick release valve. The rear axle service brake relay valve controls a supply of reservoir air to rear axle service brakes. The spring brake quick release valve provides air to apply or release the parking brake as needed.

Simultaneous application of the service brake and the parking brake, often referred to as compounding, can cause damage to various brake components. To prevent compounding, the rear axle service brake relay valve and the spring brake quick release valve are connected with an air line that delivers service brake air to the parking brake whenever the service brake is applied. If the parking brake is released and a service brake application is made, then service air sent to the spring brake quick release valve has no effect because the service air is blocked by a two-way check valve included within the spring brake quick release valve. If the parking brake is applied then there is no pressure to block the service air from opening the two-way check valve. Service air can then enter the spring brake quick release valve, which then delivers air to the spring brake chambers, which reduces the applied force of the spring. This is often referred to as anti-compounding.

This traditional configuration has some disadvantages. The spring brake quick release valve and the rear axle service brake relay valve each require a certain amount of mounting space within the vehicle, as well as requiring separate mounting hardware. This increases cost and assembly time. Also, the air line that extends between the rear axle service brake valve and the spring brake quick release valve to prevent compounding takes up valuable mounting space within the vehicle and increases cost. Further, the air line is vulnerable to damage, which could result in a loss of air pressure, and consequently reduced braking performance.

It is desirable to reduce the cost of the brake system while still providing service, emergency, and parking functions in an efficient and controlled manner. Moreover, it is desirable to reduce the complexity of the brake system and to reduce installation and assembly times. Finally, there is also a need to reduce the overall number of components within the system to reduce potential damage areas, as well as overcoming other deficiencies identified within the prior art system discussed above.

SUMMARY OF THE INVENTION

A combination quick release and service relay brake valve assembly includes a single valve body having a quick release portion and a service relay portion. The quick release portion has a parking brake port and a service brake control port. The service relay portion has a supply port that receives air from a service brake air reservoir and a delivery port fluidly connected to a brake actuator that generates service brake requests. The service brake control port is fluidly connected to a relay control passage and an anti-compounding passage formed within the valve body.

The quick release portion of the valve body comprises a main body portion, a valve seat portion, and a cover portion that includes at least one exhaust port. The quick release portion also includes a double check valve assembly having a first diaphragm positioned between the main body portion and valve seat portion, and a second diaphragm positioned between the main body portion and the cover portion. The first diaphragm may seal the anti-compounding passage or selectively seals off the parking brake port and directs air toward the second diaphragm. The second diaphragm moves to either seal off the exhaust port to allow air to be delivered to spring brake air chambers, or seals off the parking brake port and anti-compounding passage to exhaust air from brake air chambers via the exhaust port.

The service relay portion of the valve body comprises a main body portion, an exhaust body portion movable within the main body portion and defining an exhaust passage, and a cover portion. The service relay portion also includes a piston and a spring received within the main body portion. The piston is movable between a service brake applied and service brake released position. The spring biases the piston to the service brake released position. In response to a service brake request, air pressure is exerted against the piston, which moves to seal off the exhaust passage and to open a delivery port to supply air to the brake air chambers.

The combination quick release and service relay brake valve assembly consolidates multiple valve functions within a common valve assembly, which reduces cost and overall complexity in an associated vehicle brake system. These and other features of the present invention can be best understood from the following specification and drawings, the following of which is a brief description.

DETAILED DESCRIPTION OF THE PREFERRED EMBODIMENT

Figure 1:
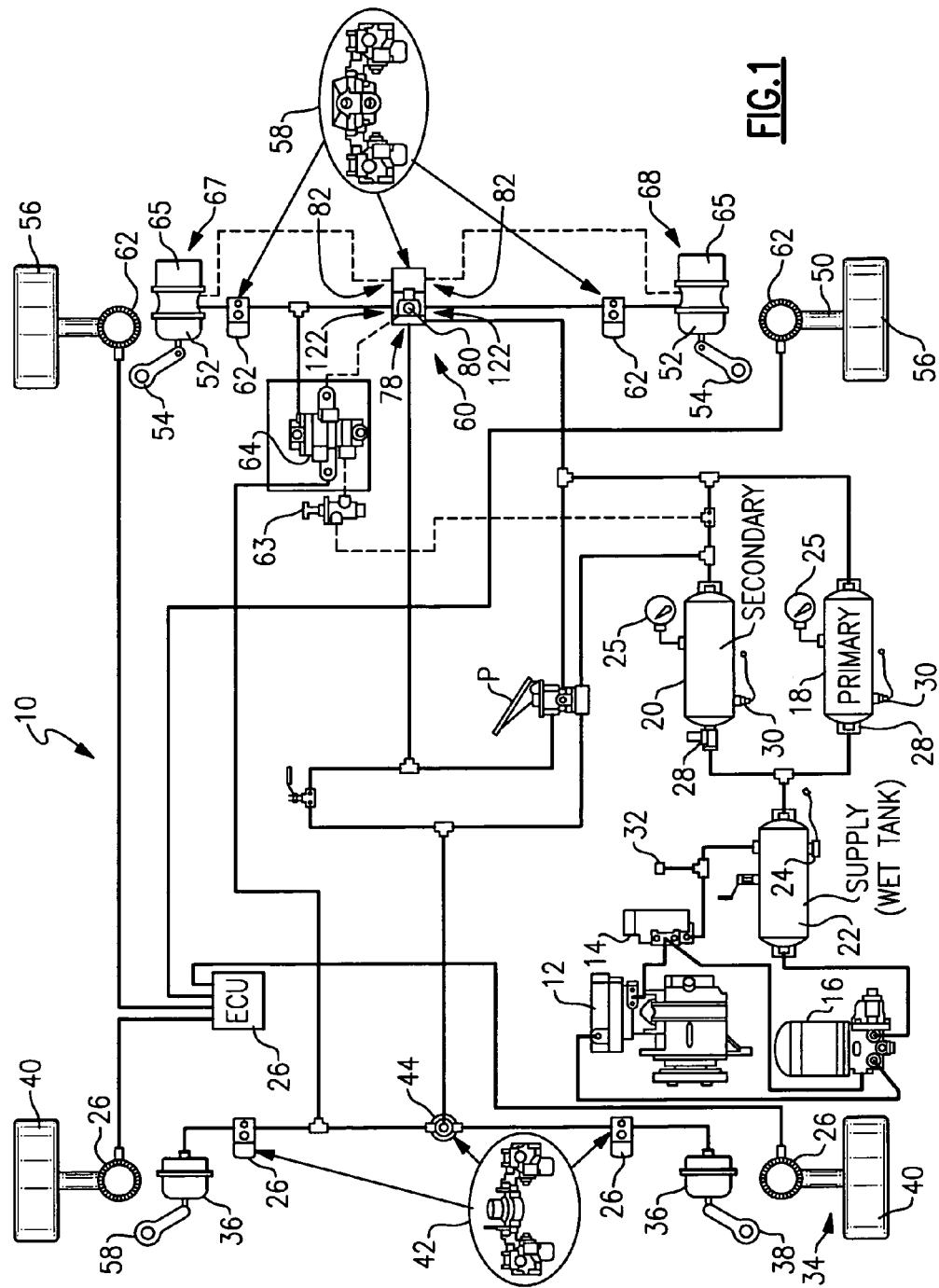
FIG. 1 is a schematic view of a vehicle brake system incorporating the subject invention.

A vehicle brake system is shown generally at 10 in FIG. 1. The vehicle brake system includes a supply sub-system including a compressor 12, governor 14, and air dryer 16 connected as shown. The supply sub-system supplies air to primary 18 and secondary 20 service brake reservoirs. A supply wet tank 22 cooperates with the air dryer 16 to supply dry air to the primary 18 and secondary 20 service brake reservoirs as known. The supply wet tank 22 includes a drain valve assembly 24 to remove water from the system.

The primary 18 and secondary 20 service brake reservoirs each include an air gauge 25, check valve 28, and drain valve 30. A low pressure indicator switch 32 monitors pressure within the supply sub-system.

A front axle 34 includes front service brake chambers 36 and slack adjusters 38 located at each front wheel 40. A front axle valve package 42 cooperates with the supply sub-system to deliver service air to the front service brake chambers 36. The front axle valve package 42 includes a quick release valve 44 and anti-lock brake system (ABS) components 26. The ABS components 26 comprise an electronic control unit (ECU), modular valves, sensors, and tooth rings as known.

A rear axle 50 includes rear service brake chambers 52 and slack adjusters 54 located at each rear wheel 56. A rear axle valve package 58 cooperates with the supply sub-system to deliver service air to the rear service brake chambers 52. The rear axle valve package includes a combination quick release and service relay valve assembly 60, and ABS components 62 similar to those described above with regard to the ABS components 26 for the front axle 34. A park brake dash valve 63 or spring brake inversion control valve 64 cooperates with the reservoirs to control air supply to a quick release valve body portion 66 of the combination quick release and service relay valve assembly 60, and then on to spring chambers 65 that are used for a parking brake 67 located at each rear wheel 56. An input, such as a foot pedal P, communicates operator service brake requests to a service brake control port 78 of the combination quick release and service relay valve assembly 60.

Figure 2:
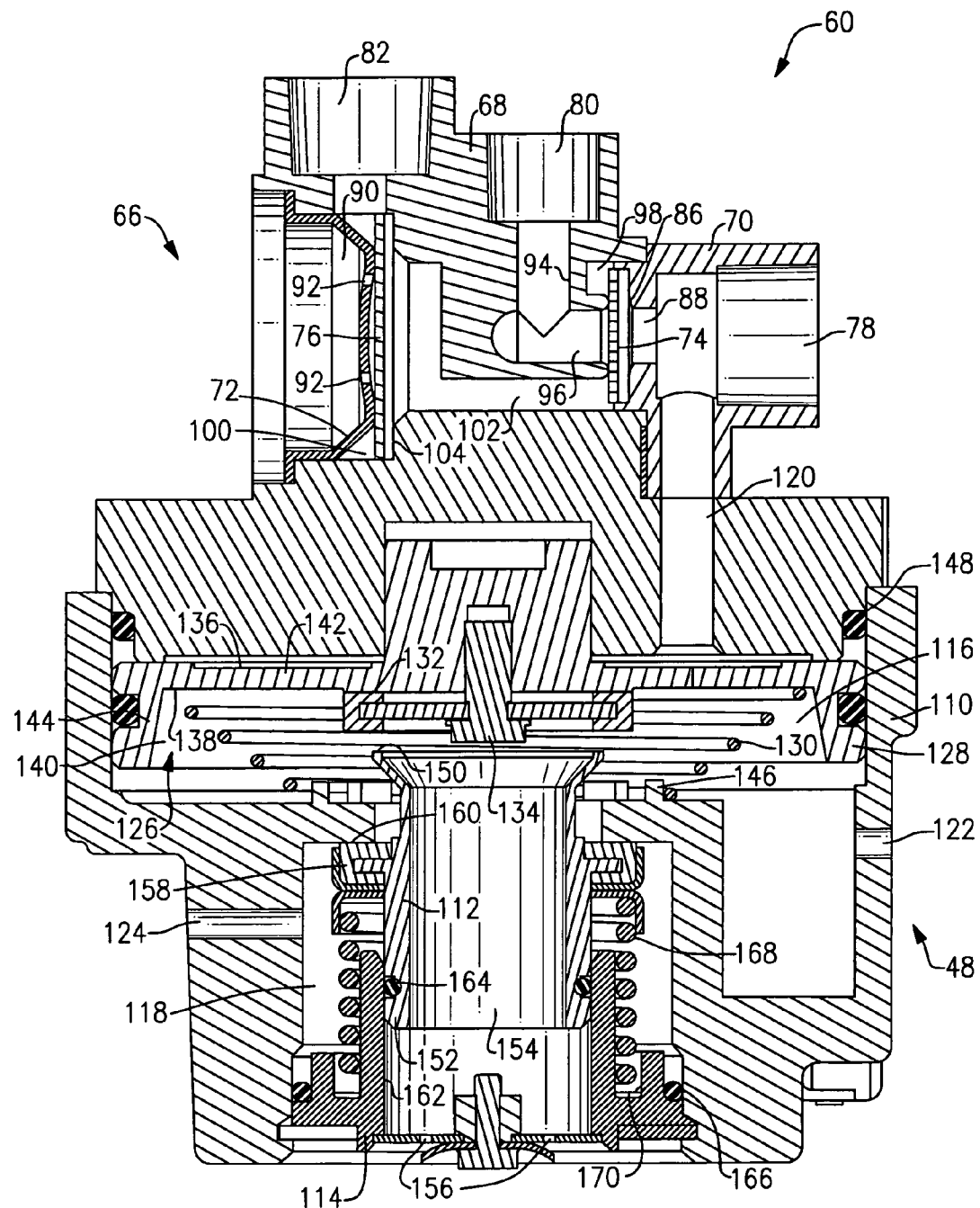
FIG. 2 is a cross-sectional view of a combination valve assembly incorporating the subject invention.

The combination quick release and service relay valve assembly 60 is shown in greater detail in FIG. 2. The combination quick release and service relay valve assembly 60 comprises a single valve body with the quick release valve body portion 66 and a service relay valve body portion 48 that are fitted together.

As shown in FIG. 2, the quick release valve body portion 66 comprises a main body portion 68, a valve seat member 70, and a cover 72. The quick release valve body portion 66 includes a double check valve with a first diaphragm 74 and a second diaphragm 76. The first diaphragm 74 is positioned between the valve seat member 70 and the main body portion 68, and the second diaphragm 76 is positioned between the main body portion 68 and the cover 72.

The quick release valve body portion 66 includes an anti-compounding passage 88 formed within the valve seat member 70 and a parking brake port 80 that is formed within the main body portion 68. A delivery port 82 is also formed within the main body portion 68. The delivery port 82 is adapted to deliver air to the spring chambers 65 for the parking brakes 67 (FIG. 1).

The valve seat member 70 is received within an opening at one end of the main body portion 68. The valve seat member 70 includes a curved surface 86 with an anti-compounding passage 88 that is in fluid communication with the service brake control port 78. The first diaphragm 74 moves to selectively seal the anti-compounding passage 88 under certain conditions. This will be discussed in greater detail below.

The cover 72 is preferably cup-shaped and extends into a cavity 90 of the main body portion 68. The cover 72 includes a plurality of exhaust ports 92 that exhaust air from the quick release valve body portion 66 under certain conditions.

The parking brake port 80 is in fluid communication with a first passage portion 94 formed within the main body portion 68. The first passage portion 94 is in fluid communication with a second passage portion 96 that forms a cavity to receive the first diaphragm 74 when the service brake control port 78 and anti-compounding passage 88 are pressurized.

The first diaphragm 74 is received within a first chamber 98 formed between the valve seat member 70 and the main body portion 68. The second diaphragm 76 is received within a second chamber 100 formed between the main body portion 68 and cover 72. A third passage portion 102, formed within the main body portion 68, fluidly connects the first 98 and second 100 chambers.

If the spring brakes are in an applied position and the service brake control port 78 is pressurized, the first diaphragm 74 folds in on itself within the second passage portion 96, which allows air to flow through the first chamber 98 and into the third passage portion 102. Pressurized air flows from the third passage portion 102 to exert a pressure force on the second diaphragm 76, which moves away from a seat portion 104 toward the cover 72. The second diaphragm 76 seals the exhaust ports 92 and opens access to the delivery port 82 to allow air to be supplied to the spring brake chambers 65. The spring brake force is therefore reduced and the anti-compounding function is accomplished.

When the parking brake port 80 is pressurized, the first diaphragm 74 moves away from the second passage portion 96 to engage the curved surface 86 and seal off the anti-compounding passage 88. Air flows through the first chamber 98, into the third passage portion 102, which causes the second diaphragm to seal off the exhaust ports 92 and open the delivery port 82 as described above.

When a parking brake request is initiated, pressurized air from the spring chambers 65 is exhausted through the delivery port 82 into the second chamber 100. This causes the second diaphragm 76 to seal against seat portion 104 to prevent air from entering the third passage portion 102. This movement also opens the exhaust port 92, such that air can be vented from the spring chambers 65 to apply the parking brakes 67.

As shown in FIG. 2, the service relay valve body portion 48 includes a main body portion 110, an exhaust portion 112 that is movable relative to the main body portion 110, and a cover portion 114. The main body portion 110 defines a first chamber 116 and a second chamber 118. The main body portion 110 defines a control passage 120 that is in fluid communication with the service brake control port 78 of the quick release valve body portion 66.

A supply port 124 is connected to the primary service brake air reservoir 18 (FIG. 1). The supply port 124 is formed within the main body portion 110. The main body portion 110 also includes a delivery port 122 that delivers air to the brake air chambers.

A valve assembly 126 is received within the first chamber 116. The valve assembly 126 includes a piston 128, spring 130, and an exhaust seal 132 that is attached to the piston 128 with a fastener 134. The piston 128 has a first side 136 that faces the control passage 120 and a second side 138 that faces the exhaust portion 112. The piston 128 has a cavity 140 formed at the second side 138 that includes a base 142 and a side wall 144 that extends away from the base 142. The exhaust seal 132 has a smaller diameter than the piston 128 and is mounted to the piston 128 on the second side 138 within the cavity 140.

The spring 130 is also mounted within the cavity 140. The spring 130 reacts between the second side 138 of the piston 128 and a spring seat 146 formed within the main body portion 110. The piston 128 is moveable between a service brakes applied position and a service brakes released position. The spring 130 biases the piston 128 to the service brakes released position but allows communication between the control passage 120 and the first side 136 of the piston 128. An O-ring seal 148 is also used to provide a sealing interface between the main body portion 110 of the service relay valve and the quick release valve body portion 66.

The exhaust portion 112 has a first end 150 that extends into the first chamber 116 and a second end 152 that extends into the second chamber 118. The exhaust portion 112 defines an exhaust passage 154 that extends from the first chamber 116 to exhaust ports 156 formed within the cover portion 114. The exhaust portion 112 includes an outer flange 158 that rests against a seat portion 160 when the piston 128 is in a service brakes released position. The second end 152 is received within an opening 162 of the cover portion 114.

An o-ring seal 164 provides a sealed interface between the exhaust portion 112 and the cover portion 114. Another o-ring seal 166 provides a sealed interface between the cover portion 114 and the main body portion 110.

A spring 168 is positioned within the second chamber 118 and reacts between the outer flange 158 and a spring seat 170 formed within the cover portion 114. The exhaust portion 112 is movable in a linear direction between an exhaust position and a non-exhaust portion. The spring 168 biases the exhaust portion 112 against the seat portion 160. When the piston 128 is in the service brake released position, the exhaust portion 112 is in the exhaust position.

When the service brake control port 78 is pressurized in response to a service brake request, pressurized air follows the control passage 120 to the first side 136 of the piston 128, and the piston 128 moves within the first chamber 116 toward the exhaust portion 112. This causes the exhaust seal 132 to move into engagement with the exhaust portion 112, which seals off the exhaust passage 154. The piston 128 then moves the exhaust portion 112 against the bias of the spring 168 to unseat the outer flange 158 from the seat portion 160. This opens supply port 124 to deliver air from the supply port 124 to the delivery port 122 and then to the brake chambers. When the pressure at the service brake control port 78 is released, the spring 130 returns the piston 128 to the service brakes released position, and the spring 168 returns the exhaust portion 112 to the exhaust position to open the exhaust passage 154.

As shown in FIG. 2, the combination quick release and service relay valve assembly 60 provides a unitary and compact valve assembly, which consolidates multiple valve functions within a common valve assembly, resulting in reduced cost and overall complexity for the vehicle brake system 10.

Although a preferred embodiment of this invention has been disclosed, a worker of ordinary skill in this art would recognize that certain modifications would come within the scope of this invention. For that reason, the following claims should be studied to determine the true scope and content of this invention.

What is claimed is:

1. A combination valve for use in a vehicle brake system comprising:
a valve body having a service relay portion and a quick release portion, said quick release portion having a parking brake port and a service brake control port that is in fluid communication with an anti-compounding passage, and said service relay portion having a supply port adapted for fluid connection to a service brake air reservoir and a delivery port adapted for fluid connection to a brake actuator that generates service brake requests wherein said service brake control port is fluidly connected to said anti-compounding passage within said valve body.

2. The combination valve according to claim 1 wherein said quick release portion includes a double check valve.

3. The combination valve according to claim 2 wherein said double check valve includes a first diaphragm positioned between said parking brake port and said anti-compounding passage, and a second diaphragm positioned between said first diaphragm and an exhaust port.

4. The combination valve according to claim 3 wherein when air pressure is exerted on said first diaphragm from said service brake control port, air is blocked at said parking brake port and is directed toward said second diaphragm, and wherein when air pressure is exerted on said first diaphragm from said parking brake port, air is blocked at said anti-compounding passage and is directed toward said second diaphragm.

5. The combination valve according to claim 4 wherein said quick release portion of said valve body comprises a main body portion including said parking brake port, a valve seat member including said service brake control port and said anti-compounding passage, and a cover including said exhaust port, said first diaphragm being supported directly between said main body portion and said valve seat member, and said second diaphragm being supported directly between said main body portion and said cover.

6. The combination valve according to claim 5 including at least one delivery port formed within said main body portion such that when air pressure is exerted against one side of said second diaphragm, said second diaphragm seals said exhaust port and supplies air to a spring brake chamber via said at least one delivery port to release a park brake, and wherein when air pressure is exerted against an opposite side of said second diaphragm, said second diaphragm blocks air from entering said service brake control port and said parking brake port and allows air from the spring brake chamber to be exhausted through said at least one delivery port to said exhaust port to apply the park brake.

7. The combination valve according to claim 1 wherein said service relay portion includes a piston movable between a service brake applied position and a service brake released position and a spring biasing said piston to said service brake released position and wherein when air pressure is exerted against said piston through a control passage in response to a service brake request, said piston moves into said service brake applied position to seal off an exhaust passage and to open at least one delivery port to communicate air pressure to a service brake actuator to apply a service brake.

8. The combination valve according to claim 7 wherein said service relay portion of said valve body comprises a main body portion defining first and second chambers, an exhaust body portion moveable relative to said main body portion and defining said exhaust passage, and a cover portion including an exhaust port, and wherein said piston and said spring are received within said first chamber and said exhaust body portion is received within said second chamber.

9. The combination valve according to claim 8 wherein said main body portion includes said supply port and said at least one delivery port.

10. The combination valve according to claim 8 wherein said cover includes an opening that slidably receives said exhaust body portion.

11. The combination valve according to claim 1 wherein the valve body includes a quick release valve body portion and a service relay valve body portion that are fitted together, and wherein said parking brake port, said service brake control port, and said anti-compounding passage are formed within said quick release valve body portion, and wherein said supply port and said delivery port are formed within said service relay valve body portion.

12. The combination valve according to claim 11 wherein said quick release valve body portion comprises a main body with a valve seat member fitted within said main body, and wherein said parking port is formed within said main body and said service brake control port and said anti-compounding passage are formed within said valve seat member, and wherein said main body includes an additional delivery port to be in fluid communication with at least one parking brake chamber.

13. A vehicle braking system comprising:
a first brake actuator adapted to supply a service brake force to a first wheel brake;
a first spring chamber associated with said first brake actuator to supply a parking brake force to the first wheel brake;
a second brake actuator adapted to supply a service brake force to a second wheel brake;
a second spring chamber associated with said second brake actuator to supply a parking brake force to the second wheel brake; and
a combination service relay and quick release valve assembly in fluid communication with said first and said second brake actuators and having a valve body comprising a service relay valve body portion and a quick release valve body portion, said quick release valve body portion having a parking brake port and a service brake control port communicating with an anti- compounding passage, and said service relay valve body portion having a supply port adapted for fluid connection to a service brake air reservoir and a control passage fluidly connected to an input that generates service brake requests wherein said control passage is fluidly connected to said anti-compounding passage within said valve body.

14. The vehicle braking system according to claim 13 wherein said quick release valve body portion includes a double check valve comprising a first diaphragm positioned between said parking brake port and said anti-compounding passage, and a second diaphragm positioned between said first diaphragm and at least one exhaust port.

15. The vehicle braking system according to claim 14 wherein said quick release valve body portion includes a first body portion including said parking brake port and at least one delivery port, a valve seat member including said service brake control port, and a cover including said at least one exhaust port, said first diaphragm being supported directly between said first body portion and said valve seat member, and said second diaphragm being supported directly between said main body portion and said cover.

16. The vehicle braking system according to 15 claim wherein when air pressure is exerted on said first diaphragm from said anti-compounding passage, air is blocked at said parking brake port and is directed toward said second diaphragm to seal said at least one exhaust port and open said at least one delivery port to deliver air to said first and second brake actuators; and wherein when air pressure is exerted on said first diaphragm from said parking brake port, air is blocked at said anti-compounding passage and is directed toward said second diaphragm to seal said at least one exhaust port and open said at least one delivery port to deliver air to said first and second spring chambers to perform a park brake release.

17. The vehicle braking system according to claim 16 wherein when air pressure is exerted against a delivery port side of said second diaphragm, said second diaphragm blocks air from entering said anti-compounding passage and said parking brake port and allows air from said first and second spring brake chambers to be exhausted through said at least one delivery port to said at least one exhaust port to generate the parking brake force.

18. The vehicle braking system according to claim 17 wherein said service relay valve body portion includes a piston movable between a service brake applied position and a service brake released position and a spring biasing said piston to said service brake released position and wherein when air pressure is exerted against said piston through said control passage, said piston moves into said service brake applied position to seal off an exhaust passage and to open at least one service delivery port to communicate air pressure to said first and second service brake actuators to apply the first and second wheel brakes.

19. The vehicle braking system according to claim 18 wherein said service relay valve body portion comprises a second body portion defining first and second chambers, an exhaust body portion moveable relative to said second body portion and defining said exhaust passage, and a cover portion including at least one service exhaust port and wherein said piston and said spring are received within said first chamber and said exhaust body portion is received within said second chamber.

20. The vehicle braking system according to claim 13 wherein the quick release valve body portion and service relay valve body portion are fitted together, and wherein said parking brake port, said service brake control port, and said anti-compounding passage are formed within said quick release valve body portion, and wherein said supply port and a delivery port to service brake air chambers are formed within said service relay valve body portion.

21. The vehicle braking system according to claim 20 wherein said quick release valve body portion comprises a main body with a valve seat member fitted within said main body, and wherein said parking port is formed within said main body and said service brake control port and said anti-compounding passage are formed within said valve seat member, and wherein said main body includes an additional delivery port to be in fluid communication with at least one parking brake chamber.

* * * * *

UNITED STATES PATENT AND TRADEMARK OFFICE
CERTIFICATE OF CORRECTION

PATENT NO. : 7,658,453 B2 Page 1 of 1
APPLICATION NO. : 11/355383
DATED : February 9, 2010
INVENTOR(S) : Thomas R. Soupal It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1030 days.

Signed and Sealed this

Twenty-eighth Day of December, 2010

David J. Kappos
*Director of the United States Patent and Trademark Office*